United States Patent [19]

Shevlin

[11] 3,736,981

[45] June 5, 1973

[54] DEVICE AND METHOD FOR STORING AND COOKING FOODSTUFFS IN A REFRIGERATED ENVIRONMENT

[75] Inventor: Thomas S. Shevlin, White Bear Lake, Minn.

[73] Assignee: Minnesota Mining and Manufacturing Company, St. Paul, Minn.

[22] Filed: Aug. 20, 1971

[21] Appl. No.: 173,414

[52] U.S. Cl. .......................... 165/2, 99/359, 165/30, 219/387
[51] Int. Cl. ............................................. F25b 13/00
[58] Field of Search .................. 99/359, 234; 165/48, 165/2, 30; 219/385, 386, 387, 403, 432, 447

[56] References Cited

UNITED STATES PATENTS 3,608,627 9/1971 Shevlin ................................... 165/30
3,381,115 4/1968 Welch ............................. 219/387 X Primary Examiner—Manuel A. Antonakas
Attorney—Kinney, Alexander, Sell, Steldt & Delahunt

[57] ABSTRACT

A method and device for storing and preparing entire meals in a refrigerated environment. Thermally insulated heating casseroles adapted to cook an entree from a frozen state along with unheated thermally insulated casseroles containing side dishes in frozen and/or chilled state are placed in removable trays which in turn are inserted into a chamber maintained at refrigerated temperatures. Each tray is adapted to hold at least one heating casserole to cook the entree along with one or more casseroles containing side dishes. Heat is applied to selected heating casseroles to cook the entrees therein while the chamber and all remaining casseroles are maintained at refrigerated temperatures. After the selected entrees are cooked, they are served with related side dishes by means of the trays. The process can be repeated with respect to the remaining casseroles in the chamber to carry out a repetitive series of meal cooking and serving for periods up to 24 hours. The refrigerated temperature levels within the chamber and the thermal insulation of each of the casseroles retards the exchange of heat between the contents of the unheated casseroles and the immediate environment so that any frozen entrees not selected for cooking and frozen side dishes do not thaw to a substantial degree and chilled side dishes do not freeze to a substantial degree.

6 Claims, 4 Drawing Figures

Patented June 5, 1973

INVENTOR
THOMAS S. SHEVLIN
BY Kinney, Alexander,
Sell, Steldt & DeLaHunt
ATTORNEYS

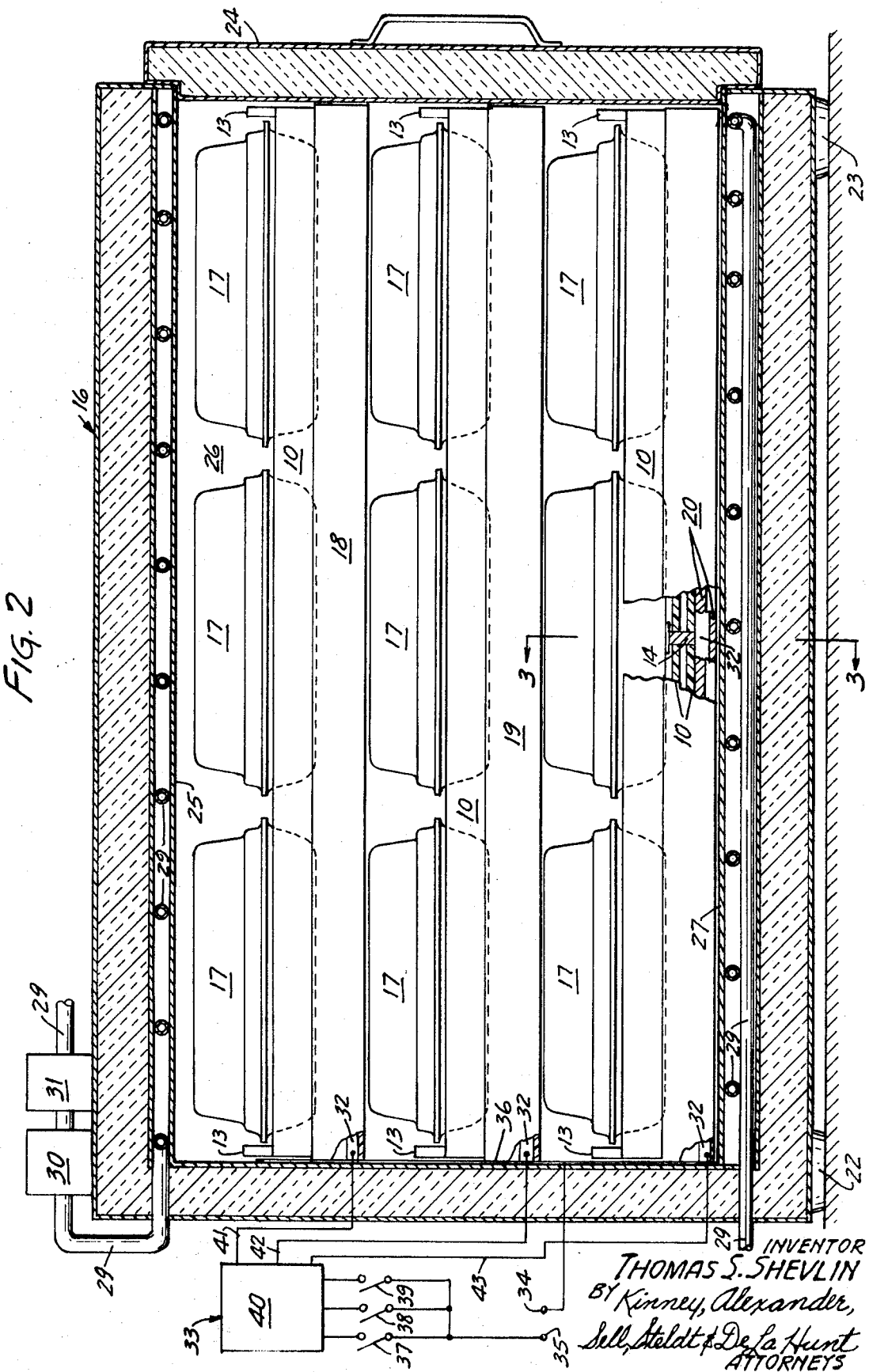

DEVICE AND METHOD FOR STORING AND COOKING FOODSTUFFS IN A REFRIGERATED ENVIRONMENT

CROSS REFERENCES

The refrigeration chamber, the heating casseroles which contain the entrees to be cooked, and the electrical system for selectively applying heat to the heating casseroles are similar to the apparatus and method described in my co-pending U.S. Pat. application, Ser. Number 781,157 filed Dec. 4, 1968 assigned to Minnesota Mining and Manufacturing Company, which eventually issued into U.S. Pat. No. 3,608,627. The trays for holding the casseroles may be adapted to be supported on magnetic electrical connectors which supply electrical energy to the heating casseroles, the connectors being shown and described in a co-pending application to Richard E. Fayling, Ser. Number 775,625, filed Nov. 14, 1968, assigned to Minnesota Mining and Manufacturing Company and which eventually issued into U.S. Pat. No. 3,654,854.

BACKGROUND OF THE INVENTION

This invention relates to a device and method in which entire meals, including entrees to be cooked and side dishes of chilled and/or frozen foods for serving with the entree, may be stored and subsequently prepared for serving. Storage and preparation is carried out simultaneously in a single undivided chamber maintained at refrigerated temperatures. The food need not be handled until ready for serving.

Most prior art devices have been developed for the purpose of storing foods in special compartments at elevated temperature levels within a refrigerator or, alternately, storing food at refrigerated levels and subsequently closing off the refrigerant and applying heat to cook the food. For example, Butler et al., U. S. Pat. No. 2,253,927, illustrates a separate butter compartment or dish disposed over a heater controlled by a conventional thermostat for maintaining butter at a constant temperature of about 58° F. The entire unit is placed in a conventional refrigerator. Goodman et al., U. S. Pat. No. 3,353,476, describes a specially insulated chamber that contains both a refrigeration and heating system. Food suitable for subsequent cooking is placed in the chamber and maintained at temperature levels satisfactory for preservation by the refrigeration system. When it is desired to cook the food, the refrigeration system is closed off and the heating system is then energized to cook the food. These inventions, however, do not provide a system for storing and selectively preparing a series of meals. They are not directed to a completely automatic system which simultaneously stores and prepares repetitive serving of complete meals consisting of cooked entrees, frozen and chilled side dishes.

SUMMARY OF THE INVENTION

This invention discloses a system for storing prepacked food in a refrigerated environment and automatically preparing selected individual meals containing both entrees and related side dishes while in the refrigerated environment. For purposes of explaining this invention, it is understood that a refrigerated environment means temperature levels generally within the range of 20°–40° F.; frozen foods means food in which the moisture content thereof is in a crystalline state and its temperature level is at or below 30° F.; chilled foods means food in which the moisture content thereof is in a liquid state and the temperature level is in the range of 30°–40° F. Food in the form of individual servings or in bulk packaging is placed into thermally insulated receptacles or casseroles. The entrees containing the portion of the meal to be subsequently cooked are placed in heating casseroles having heating elements associated therewith. The side dishes containing food to be served in chilled or frozen state (e.g., salads and ice cream respectively) in association with the entrees are contained in unheated casseroles. The casseroles are placed in trays which may also be thermally insulated and the trays are then placed in a chamber adapted to be kept at selected temperature levels within the 20°–40° F. range. The chamber contains a timing system to selectively energize the heating casseroles for cooking selected entrees and after cooking the entrees are served in their casseroles along with associated side dishes of frozen and/or chilled foods in the unheated casseroles, all casseroles being contained in the trays. The system is adapted to cook and serve a series of meals in repetitive order until all trays of casseroles are served. The refrigerated environment plus the thermal insulation of the individual casseroles retards the rate of heat exchange between the contents of the casseroles and the surrounding environment so that there is no change of phase or fusion with respect to frozen uncooked entrees, frozen side dishes and chilled side dishes. Uncooked and unserved food may be retained in the system for up to 24 hours at which point of time it is preferred to remove the chilled food and refreeze the frozen side dishes and uncooked entrees either in the system at temperature levels lower than its normal operating temperatures or in a separate freezer. Chilled foods that do not spoil over prolonged refrigerated periods and the refrozen foods can be subsequently reintroduced or recycled into the system for repetitive cooking and serving.

DESCRIPTION OF THE DRAWINGS

Understanding of the invention will be facilitated by referring to the accompanying drawings in which like numerals refer to like parts in the several views and in which

FIG. 2 is a side view of a combination freezing and cooking chamber adapted to support the trays and store and prepare the food in the casseroles, the side of the chamber broken away to show its interior structure and the supporting means for the trays partially broken away;

DETAILED DESCRIPTION

The entree and each side dish of food is packed in separate thermally insulated casseroles. The food in each casserole (entree or side dish) may be packed in bulk or packed in individual meal-sized portions for direct serving in the casseroles. The entrees are placed in heating casseroles, each having an associated heating element. The heating casseroles are preferably made of metal having a low heat capacity so that substantially all of the heat generated by the heating element is passed into the food. The heating elements are interconnected to an electric timing circuit controlled by a timer adapted to energize selected casseroles constantly throughout the prescribed cooking period or in intermittent intervals of time. The side dishes (e.g., salads, deserts such as ice cream, eclairs, jellos, cheese cakes, etc.) are packed in unheated casseroles. The unheated casseroles may be identical to the heating casseroles except for the fact that the heating elements associated therewith are not connected to the timing circuit. Alternately, the unheated casseroles may be designed specifically to contain only side dish food. The casseroles are placed in trays which are inserted into a refrigerator or chamber of desired size and refrigeration capacity so that the temperature levels within the chamber are maintained in the range of 20°–40° F.

The exemplary apparatus and method described herein illustrates the use of the system in preparing individual meal servings in a small lightweight refrigeration-heating chamber, it being understood that the system can be easily adapted to be used in various forms of chambers having greater storage capacities and capable of cooking larger quantities of entrees. In the exemplary apparatus and method, each meal is served on a tray supporting a heating casserole containing the entree and one or more unheated casseroles containing side dishes of salads, deserts, etc.

Figure 1:
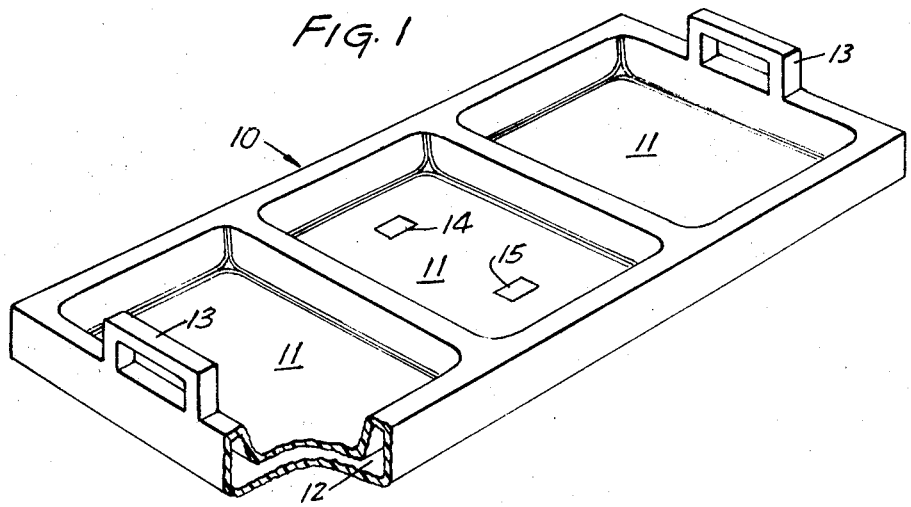
FIG. 1 is a perspective view partially broken away of a serving tray adapted to hold a heating casserole for cooking the entree and two unheated casseroles for containing side dishes served with the entree.

The tray 10 for supporting the casseroles is best shown in FIG. 1. It may be made of polymeric materials such as styrene and is formed with recesses 11 suitably shaped to seat individual casseroles. Tray 10 may have a hollow interior 12 which serves as a thermal air barrier. Hollow interior 12 may be filled with a suitable insulation such as glass fibers or tray 10 may be molded from solid sections of polystyrene. The trays contain handles 13 for convenience in handling. The bottom of the central recess 11 contains a pair of metal contact plates 14 and 15 which extend completely through the tray and are flush with its bottom surface as best seen in FIG. 3.

FIG. 2 shows the lightweight refrigeration chamber 16 containing a series of trays 10 each supporting three casseroles generally designated 17. The trays 10 are supported in the chamber 16 by a series of rails 18, 19, 20 and 21 (rail 21 being shown only in FIG. 3). The chamber has inner and outer walls (not numbered) to form a double wall and the interspace between them is filled with insulation. The chamber is supported by legs numbered 22 and 23. A door 24 is suitably hinged to the forward end of the chamber and gaskets (not shown) are bonded around its periphery to prevent leakage of air when the door is closed. Spaced from the inner top, side and bottom walls of the chamber are a series of panels 25, 26, 27 and 28 which form an interior wall in the chamber. Means to conduct a suitable refrigerant (such as flourinated hydrocarbons, ammonia or carbon dioxide) to maintain the chamber at refrigerated temperatures consists of coils 29 convoluted around the periphery of the interior of the chamber in the interspace between panels 25, 26, 27 and 28 and the double wall. The refrigerant is circulated through the coils 29 by means of compressor 30. A condensor 31 removes heat carried by the refrigerant to the condenser.

Figure 3:
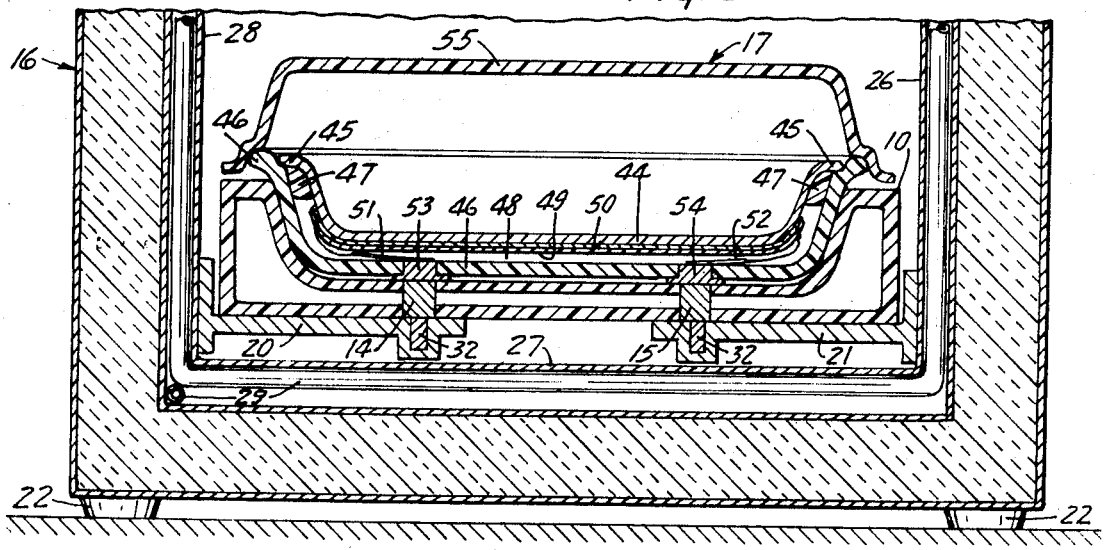
FIG. 3 is a sectional view of the lower portion of the chamber of FIG. 2 taken along the lines and in the direction of the arrows 2—2 of FIG. 2.

By viewing FIG. 2 and 3 it is seen that each tray 10 is supported for slidable movement into and out of the chamber by means of the rails 18–21. The rails consist of partially convoluted and L-shape electrically insulating material preferably a thermoplastic composition such as melamine. Each rail is suitably secured to the side panels 26 and 28. An electrically conductive contact member 32 is suitably embedded in each rail to conduct current to the heating elements of the heating casseroles as explained below. Although contact member 32 may be of any type of electrically conductive material, in some situations it may be preferred that the contact member 32 of each rail 18–21 be manufactured of magnetic material such as the type described in the co-pending application of Richard E. Fayling, Ser. No. 775,625, filed Nov. 14, 1968, assigned to Minnesota Mining and Manufacturing Company and issued into U.S. Pat. No. 3,654,854. The description of the rails in that application is incorporated by reference into this application to illustrate an embodiment of the contact members 32.

As seen in FIG. 2, the inner end of each contact member 32 of rails 18–21 is connected to a timing circuit generally designated 33. Power leads 34 and 35 are connected to a power source. Power lead 34 is interconnected to a bus bar 36 which in turn is connected to contact member 32 of rail 21 and the contact members of the other rails located on the right side of the FIG. 3 embodiment which are not shown in the drawings. Power lead 35 is connected to a series of switches 37, 38 and 39 operated by a timer 40. Timer 40 has leads 41, 42 and 43 which connect respectively with the contact member 32 of each rail 18, 19 and 20. The circuit to each rail can thus be energized by closing the appropriate switch, e.g., switch 37 to energize the contact member 32 of rail 18; switch 38 to energize the contact member of rail 19; and switch 39 to energize the contact member of rail 20. Any selected switch 37–39 may be closed by the timer to energize a selected contact member 32 and in turn the heating casserole 17 supported over the contact member by tray 10. The electrical energy may be applied constantly throughout a predetermined cooking period and the heat applied to each heating casserole controlled by a thermostat integral with the casserole's heating element to retain cooking temperatures within desired ranges.

In this embodiment, however, it is preferred to suitably integrate timer 40 with switches 37–39 so that they operate as a single controlling unit to pulse energize the heating elements in discrete on and off intervals (e.g., 10 seconds on and 15 seconds off, etc.) throughout the cooking period. When the electrical energy and the resultant thermal energy are applied in pulsations of this nature, the heat is applied in spaced intervals of time to reduce the possibility of scorching the food, i.e., allowing the food during the off intervals to absorb heat induced during the on intervals. It is found by applying heat in this manner, the use of thermo-stats may be avoided and the food is cooked faster and with a higher degree of quality.

FIG. 3 shows a detailed view of the construction of the heating casseroles 17 for cooking the entrees which are placed in recesses 11 of trays 10. The heating casseroles have a metal dish-shaped member 44, the upper peripheral edges thereof terminating in a lip 45 which mates with a similar lip member on the periphery of a base 46 which is also dish-shaped and preferably molded from suitable polymeric material such as polysulfone and having adequate thermal insulating characteristics. A gasket 47 adhered to the upper peripheral edges of dish 44 and base 46 adjacent their common juncture seals and adheres dish 44 to base 46 so that the former is suspended within base 46 and in spaced relation thereto to form a thermally insulating air void 48 between the dish and base. The lower portion or bottom wall of dish 44 interfacing with base 46 has an electric heating element or resistor 49 integrally formed with the dish and insulated therefrom by a suitable dielectric layer 50 bonded to the dish. Element 49 may be a wire resistor although it is preferred to use a thick film resistor bonded to the dielectric layer 50 so that heat produced by the resistor will be efficiently transferred up through dish 44 to the food contained thereon. Suitable leads from the resistor 49 are connected to resilient contacts 51 and 52 disposed in void 48. The opposite end of the resilient contacts 51 and 52 are connected to metal discs 53 and 54 embedded in the bottom of base 46. Discs 53 and 54 contact the plates 14 and 15 of tray 10 which in turn are in contact with the contact member 32 of rails 18–21 to complete the circuit from the contact members 32 on the rails through the resistors 50 of the heating casseroles.

It is preferred that metal dish 44 has a low heat capacity so that substantially all the heat produced by resistor 49 will pass through the dish into the food. Highly responsive thermal characteristics are essential to the dish so that there is no lag in the transfer of heat from the element to the food upon initial energization of the element and the resulting production of heat. Further, substantially complete passage of heat through the dish 44 during cooking reduces heat transferred to the ambient air and surrounding environment in chamber 16. Additionally, rapid transfer reduces any lag or continued heat transfer once resistor 49 is de-energized. These characteristics are essential to provide the combination of thermally efficient refrigeration and pulsed energy cooking.

A dish 44 comprising 20 guage porcelain enamel coated mild steel having a weight of 1.5 pounds per square foot and a heat capacity of 0.520 calories per square inch per degree Centigrade was found to operate highly satisfactorily. Air void 48 provides a thermally insulating space below resistor 49 to prevent excessive heat loss from the bottom of the casserole. If desired, the void 48 may be filled with insulating material such as fiberglas.

A suitably thermally insulated cover 55 is formed to resiliently fit over the top of each casserole 17. A rigid molded foamed polystyrene cover was found to be highly satisfactory for this purpose.

By viewing FIGS. 1 and 2, it is seen that the center casserole 17 is the only casserole on each tray that is in electrical contact with the contact members 32 of each rail 18–21. The casseroles 17 at the opposite ends of each tray 10 contain the side dishes (salads, ice cream, etc.) and, of course, are not heated. The unheated casseroles 17 containing side dishes may be constructed identical with the heating casserole so that they may be alternately used for heating entrees and containing side dishes. Conversely, they may be constructed without heating elements 49 and dielectric layer 50. Other forms of unheated side dish casseroles may be used. For example, they may be constructed of melamine eliminating the metal dish 44 or constructed from other suitable material that has the requisite insulating properties and is capable of being designed and manufactured to form an attractive and practical serving dish, e.g., bowl-shaped dishes for salads, cup-like dishes for ice cream, etc.

In storing and repetitively preparing full course meals in a single enclosed environment, it is important to prevent the occurrence of a change of phase, change of state or fusion of chilled and frozen side dish foods. For example, frozen side dishes, such as ice cream, sherberts, frozen ice cream rolls, frozen custards, etc., must not be allowed to thaw to any appreciable extent due to heat created by entrees selected for cooking, any heat leakage into the refrigerated chamber or heat entering chamber 16 when door 24 is open. Conversely, chilled side dish foods, such as jellos and salads, must not be allowed to freeze in the event refrigerated temperature levels in chamber 16 reach their lower levels during prolonged periods of storage between successive entree cookings. It was found that in this system, satisfactory results are obtained if the permitted degree of thaw of frozen side dishes is maintained in the range of about 0 to 50 percent. Conversely, the permitted degree of freeze for chilled foods, such as salads, should preferable be maintained in the range of 0 to 30 percent. If the frozen side dishes exceed a 50 percent thaw, they exhibit a slushy effect and the chilled salads, when frozen over 30 percent, exhibit a generally unattractive texture and color. Side dish foods kept within the suggested freeze-thaw percentages do not deteriorate or exhibit degrading effects. Thus, it is important that the rate of heat exchange between the side dish food and its surrounding environment be retarded to prevent freezing or thawing above the preferred percentage ranges.

Retarding the heat exchange rate (and thus the change of phase process) is not critical with respect to frozen entrees which may be packed into casserole 17 either in frozen (less than 30° F.) or chilled (30°–40° F.) state. Whether or not retardation of the change of phase process is important with respect to the entrees depends upon the circumstances under which the system is to be operated.

In some situations, it may be desired to refreeze entrees that have not been selected for cooking during the normal operating periods of the system, e.g., air line meal preparation and serving. After normal operation, the uncooked entrees are refrozen at temperature levels below 20° F. and at some subsequent time reintroduced or recycled into the system. If it is contemplated that the entrees will be handled in this manner, it is preferred that such entrees be kept in frozen state during the time they are in a normally operating system. In such situations, the frozen entrees should be retained in casseroles 17 at temperature levels at or below the change of phase temperature of the entree foods. The permissible percentage of thaw is not as significant as in the case of the frozen side dishes, the important factor being to limit thawing so that no degradation effects occur when the entree is subsequently refrozen at the lower temperature ranges.

Conversely, if it is expected that all entrees placed into the system will be prepared for serving within a comparatively shot period of time (e.g., less than 24 hours) they may be placed in casserole 17 in chilled state or in a frozen state and subsequently allowed to thaw. However, in actual practice, entrees packed into the casseroles in frozen state will seldom thaw due to retardation of the rate of heat exchange discussed below.

In checking the quality of cooked entree foods, it was found that entrees that are allowed to completely thaw in the system or are initially placed in the system in a chilled state do not exhibit any degrading effects or unpalatable appearances when they are subsequently cooked. However, when cooking partially thawed entrees, completely thawed entrees or entrees that have been initially placed in the system in chilled state, it is obvious that the amount of heat required for cooking is less than the heat required to cook entrees that are in a completely frozen state at the commencement of cooking. For example, the amount of heat required to cook a 10 oz. entree in 5×7 inch casseroles 17 constructed as described above from a completely frozen state to cooked condition is about 200 B.T.U. The amount of heat required to cook a 10 oz. entree from chilled state to cooked condition is about one half this amount or 100 B.T.U. The amount of heat required to cook entrees from frozen state, from chilled state or from any intermediary degree of thaw (such as an entree thawed to an extent of about 50 percent) can be easily adjusted by increasing or decreasing the amount of electrical energy pulsed into the heating element of the casseroles containing entree food during the cooking period via adjustment of timer 40 or altering the time of the cooking period. If entrees in the system are in various degrees of freeze-thaw states, it is necessary for the operator to be aware of the state of each entree so that the proper amount of electrical energy can be applied.

It is recognized that during periods of cooking selected entrees and/or prolonged storage of food, a certain amount of heat exchange between the food in each casserole and its immediate environment is inevitable. By maintaining the temperature of a substantial portion of the interior of chamber 11 within the 20°–40° F. range and insulating each casserole 17 substantially as described above, the system retards the rate of heat exchange between the food and its immediate environment and, therefore, the change of phase process in the food will likewise be retarded. The controlling factors for the change of phase process are the efficiency of the casserole's insulation and the differential between temperature levels of food within the unheated casseroles and the environment immediately surrounding the food. It is thus incumbent upon the temperature levels in the chamber and the insulation of each casserole to maintain the temperature of the food in the side dishes and any entrees that are to be retained in frozen state within ranges adequate to limit food thawing or freezing.

In order to limit food thawing or freezing, the temperature of the food should be kept at levels that do not traverse the temperature level of the food's change of phase point, i.e., frozen side dishes and any entrees to be retained in frozen state prior to cooking should not completely melt and chilled foods should not completely freeze, the percentage of freeze-thaw of the side dishes preferably being within the above suggested ranges. Inasmuch as foodstuffs are essentially dilute solutions, the change of phase (melting-freezing) point of foods is about 30° F. and it is this temperature level that should not be substantially traversed whenever the side dishes and the entrees to be held in frozen state are retained in the system under normal operating conditions.

Figure 4:
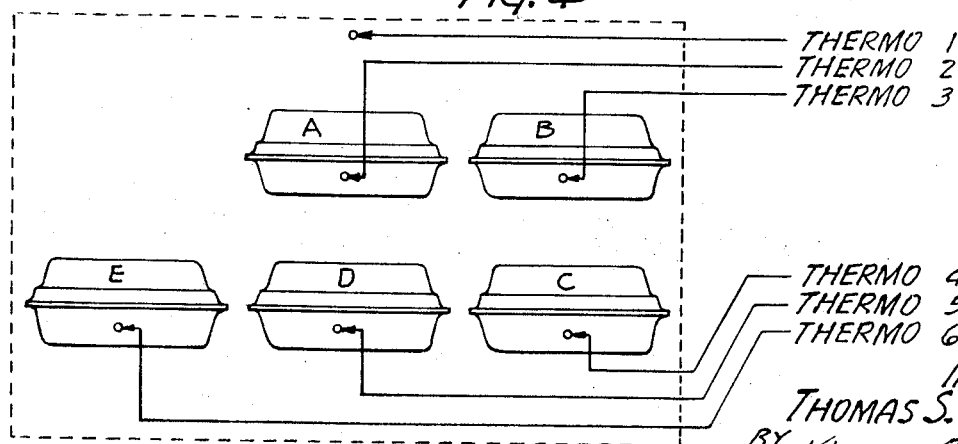
FIG. 4 is a schematic diagram showing the location of thermocouples used in determining the temperature of the food in the individual casseroles and the ambient air within the chamber.

The following tests were run to indicate that the system effectively retards the rate of heat exchange and that temperature levels of food within unheated casseroles 17 do not substantially traverse the change of phase point of the food during operation of the system. FIG. 4 schematically shows an arrangement of 5×7 inch casseroles A–E similar in structure to casseroles 17 (air void 48 not being filled with insulation material) each packed with approximately 10 oz. of food. Two types of entree meals (goulash and steak) and side dishes of ice cream were used as the "frozen foods" after first freezing them to approximately 0°–10° F. and then placing them in the arrangement. Chilled foods consisting of salads and eclairs were first brought to temperatures of about 34°–44° F. and then placed into the arrangement. The FIG. 4 arrangement was placed in a conventional refrigerator.

Thermocouples (schematically represented by circles in FIG. 4) were placed at the approximate center of the food in each casserole and connected to apparatus to record temperatures. The resistor 49 of the casserole for heating one of the entrees (the goulash in casserole D) was connected to a timing circuit and timer similar to timer 40. In two of the tests, thermocouple 1 of FIG. 4 was located above the unheated entrees (the frozen steak meal in casserole A) to measure the temperature of the ambient air at that location. Casserole D containing the frozen goulash was energized for a 20-minute period to cook the goulash after it had been stored in the refrigerator for 2 hours. Unlike actual practice of the system, after cooking casserole D was retained in the refrigerator to prevent entry of outside air so that temperature recordings could be recorded for periods up to 15 hours to adequately determine the freeze-thaw effects on both frozen and chilled foods.

Table I below shows recordings of temperatures in degrees Fahrenheit of frozen entrees (thermocouple 2 in casserole A), a frozen side dish (thermocouple 6 in casserole E), two side dishes of chilled foods (thermocouples 3 and 4 in casseroles B and C respectively), and a cooked meal (thermocouple 5 in casserole D). The refrigerator for these series of recordings was set to maintain an overall chamber temperature of 20° F. As can be seen from the table, the frozen side dish recorded by thermocouple 6 and the frozen entree recorded by thermocouple 2 were retained at temperatures well below their change of phase point of 30° F. Also, the chilled side dishes (registered by thermocouples 3 and 4) were maintained at temperatures above their change of phase point of 30° F. Thus, it is seen that for the 6-hour recording time, none of the frozen foods reached a temperature level above its change of phase point and the temperature levels of the chilled foods did not drop to the change of phase point.

TABLE I

| | CASSEROLES | | | | |
| --- | --- | --- | --- | --- | --- |
| | A | B | C | D | E |
| Thermo 1 | Thermo 2 | Thermo 3 | Thermo 4 | Thermo 5 | Thermo 6 |
| Time hrs. | (Frozen Entree) | (Salad) | (Salad) | (Cooked Entree) | (Ice Cream) |
| 0 | 14 | 40 | 42 | 10 | 6 |

| | | | | | |
|---|---|---|---|---|---|
| 1 | 14 | 36 | 37 | 17 | 14 |
| 2 | 16 | 32 | 33 | 18 | 16 |
| 3 | 22 | 32 | 34 | 180 | 19 |
| 4 | 23 | 32 | 34 | 160 | 21 |
| 5 | 23 | 31 | 33 | 155 | 23 |
| 6 | 24 | 31 | 33 | 150 | 24 |

Table II below illustrates recordings for temperatures of foods in casseroles A–E as well as the temperature of the ambient air recorded by thermocouple 1 when the refrigerator was set to maintain an overall chamber temperature of 35° F. In this particular series of registrations, the frozen entree was recorded by thermocouple 2; the frozen side dish by thermocouple 3; the chilled side dishes by thermocouples 4 and 6 (the side dishes in these two casseroles being respectively a salad in casserole C and an eclair in casserole E); and the cooked entree by thermocouple 5. As in the Table I series of recordings, the frozen side dish (thermocouple 3 recording) and frozen entree (thermocouple 2 recording) were retained throughout the 15 hours of recordings at temperature levels below their change of phase point even though the cooked entree (thermocouple 5 recording) reached levels as high as 190° F. Chilled foods recorded by thermocouples 4 and 6 were retained at temperatures well above their change of phase point. The refrigeration capacity of the refrigerator maintained the ambient air at thermocouple 1 within ± 4° or 5° F. of the fusion point of 30° F.

TABLE II

| | | CASSEROLES | | | |
|---|---|---|---|---|---|
| | A | B | C | D | E |
| Time hrs. | Thermo 1 (Air) | Thermo 2 (Frozen Entree) | Thermo 3 (Ice Cream) | Thermo 4 (Salad) | Thermo 5 (Cooked Entree) | Thermo 6 (Eclair) |
| 0 | 35 | 10 | 2 | 36 | 12 | 34 |
| 1 | 26 | 16 | 13 | 36 | 18 | 36 |
| 2 | 28 | 21 | 17 | 34 | 20 | 34 |
| 3 | 35 | 24 | 20 | 34 | 190 | 36 |
| 4 | 32 | 25 | 21 | 36 | 150 | 36 |
| 5 | 33 | 26 | 23 | 37 | 70 | 36 |
| 6 | 32 | 25 | 24 | 37 | 51 | 35 |
| 7 | 31 | 25 | 24 | 37 | 45 | 35 |
| 8 | 30 | 25 | 24 | 37 | 39 | 34 |
| 9 | 32 | 25 | 24 | 36 | 37 | 34 |
| 10 | 30 | 25 | 24 | 36 | 37 | 34 |
| 11 | 32 | 25 | 24 | 36 | 35 | 33 |
| 12 | 30 | 25 | 25 | 35 | 35 | 33 |
| 13 | 31 | 26 | 25 | 35 | 35 | 33 |
| 14 | 30 | 26 | 25 | 35 | 34 | 33 |
| 15 | 30 | 26 | 25 | 35 | 34 | 33 |

In the series of recordings illustrated in Table III, the various foods were packed in casseroles A–E and the temperatures recorded in thermocouples 1–6 in exactly the same arrangement described with reference to Table II. In this series, the refrigerator was set to maintain an overall chamber temperature of 40° F. and recordings were made over a 15-hour period. It is noted that at a 40° F. chamber temperature for a 15-hour period, the temperature of the frozen entree recorded by thermocouple 2 reached, but did not exceed, its change of phase point of 30° F. However, the frozen side dish (the ice cream in casserole B recorded by thermocouple 3) exceeded the temperature level of its fusion point for the last 10 hours during recordings by an approximate average of 5° F. Thus, in situations where chamber 16 is to be maintained at the upper ranges of the refrigerated temperatures, care must be taken to provide a properly insulated casserole 17 for frozen side dishes such as ice cream, frozen custards, etc. Whenever the described embodiments of casserole 17 are used for frozen side dishes, insulation should be placed in void 48 and care must be taken in choosing the thermal insulating capabilities of cover 55 as well as the design of the cover so that it will provide a tight thermal barrier over the top of the casserole. Alternately, the side dish casseroles for frozen foods such as ice cream, etc. may be a molded polystyrene dish and cover of appropriate design to increase the thermal insulating capabilities of the casserole and thus retain the ice cream at temperature levels below its fusion point. Alternately, a refrigerant such as dry ice may be added to the ice cream at the time it is initially packed in the side dish casserole to maintain temperature levels of the ice cream below 30° F. during the time the system is operated at the upper temperature levels.

The chilled foods registered by thermocouples 4 and 6 in the Table III recordings were retained at temperatures well above the temperature level of their change of phase point.

TABLE III

| | | CASSEROLES | | | |
|---|---|---|---|---|---|
| | A | B | C | D | E |
| time hrs. | Thermo 1 Air | Thermo 2 (Frozen Entree) | Thermo 3 (Ice Cream) | Thermo 4 (Salad) | Thermo 5 (Cooked Entree) | Thermo 6 (Eclair Entree) |
| 0 | 41 | 18 | 11 | 44 | 12 | 40 |
| 1 | 33 | 21 | 16 | 43 | 20 | 42 |
| 2 | 32 | 24 | 22 | 40 | 22 | 40 |
| 3 | 36 | 26 | 24 | 41 | 212 | 40 |
| 4 | 34 | 26 | 26 | 41 | 160 | 40 |
| 5 | 33 | 28 | 33 | 39 | 64 | 39 |
| 6 | 32 | 28 | 35 | 38 | 45 | 38 |
| 7 | 32 | 29 | 36 | 37 | 38 | 37 |
| 8 | 33 | 29 | 36 | 36 | 36 | 36 |
| 9 | 32 | 29 | 36 | 36 | 36 | 36 |
| 10 | 31 | 30 | 36 | 35 | 35 | 35 |
| 11 | 32 | 30 | 35 | 35 | 34 | 35 |
| 12 | 31 | 30 | 34 | 34 | 33 | 34 |
| 13 | 32 | 30 | 35 | 34 | 33 | 34 |
| 14 | 31 | 30 | 35 | 34 | 33 | 34 |
| 15 | 32 | 30 | 35 | 34 | 33 | 34 |

The initial lower temperature levels of the frozen entrees and ice cream side dishes shown in Tables I–III are not within the typical refrigeration temperature levels of the system. Instead, they reflect the temperature levels attained by freezing these foods prior to being placed in the system for simultaneous storage and food preparation.

Relative to maintaining foods for chilled side dishes (which in most servings would include salads), it was found that by wrapping salads in polyethylene bags and placing them in the casseroles 17, an added thermal barrier was achieved to further reduce heat loss. The effect of the bag substantially lowered the rate of heat exchange between the salad and its environment when compared with unwrapped salads placed in casseroles 17. A polyethylene or similar insulated wrapping could be used for other chilled side dishes which can be conveniently inserted and removed from the wrapping.

It is noted above that in order to fully measure the freeze-thaw effects, only one meal was cooked during the registrations recorded in Tables I–III. Repetitive cookings of entrees would not appreciably change the temperatures as recorded in the Tables inasmuch as the refrigeration means of the chamber may be set to maintain the overall chamber temperature at the stated levels of 20°, 35° and 40° F.

In actual use of the system, it is preferred that the entrees and frozen side dishes are first frozen in casseroles 17. Freezing may be accomplished in a separate refrigeration unit or in chamber 16 set at freezing temperature ranges. The frozen food, along with chilled side dishes properly pre-chilled, are then arranged in chamber 16 on trays 10 as shown in the FIG. 2 example. Chamber 16 may, of course, hold a much larger capacity of trays 10 than shown in the drawings.

The contact members 32 of the various rails 18–21 may be simultaneously energized or selectively energized by the timing circuit 33 so that all heating casseroles or only those heating casseroles supported on selectively energized rails are heated via the energization of their respective resistors 49. Thus, one may select all or certain entrees for cooking at any given time. Once food in the selected entree heating casseroles is cooked, the trays 10 containing the cooked entrees and related side dish food in the unheated casseroles are removed from chamber 16 for serving. A successive series of entree heating casseroles may than be cooked and subsequently served with their side dishes on tray 10. Thus, meals may be repetitively prepared and served until all trays have been removed from the chamber 16 for serving. Alternately, some of the trays 10 containing entrees and side dishes that have not been selected for cooking and serving may continue to be stored in chamber 16 despite the preparation and servings of food on the selected trays as long as the percentage of thaw of frozen side dish food is maintained under the preferable maximum level of 50% and the percentage of freeze for chilled foods is retained under the preferable level of 30 percent.

It is preferred that the time period of operation for the system be limited to 24 hours when simultaneously storing food and selectively preparing food for serving, i.e., during normal operation of the system. Limitation to a 24-hour period insures that the food temperatures will not exceed the temperature level of the food's change of phase point (30° F.) and under most operating conditions will not exceed a 50 percent thaw (for frozen side dish foods) or a 30 percent freeze (for chilled side dish foods). At the end of a 24-hour period, the chilled foods can be removed to another chamber 11 or to a regular refrigerating unit maintained at 35°–40° F. Any frozen entrees and frozen side dishes remaining in the chamber 16 after the chilled foods have been removed may then be solidly refrozen by lowering the temperature of chamber 16 to appropriate freezing temperature levels. Inasmuch as the frozen side dishes do not achieve over a 50 percent thaw and the frozen entrees do not completely thaw, refreezing has no deleterious effect on the food and the food may again be used for subsequent cookings and servings in the system. It is understood that refreezing can be accomplished in regular freezing units, thus, freeing chamber 16 for storing and preparing food inserted in freshly packed casseroles 17.

The system can repetitively prepare full course meals of varying menus. Entrees cooked from either frozen or chilled state may be served with side dishes containing both chilled and frozen foods or the serving may contain all chilled or all frozen side dishes. For example, all or selected entrees may be served with chilled salads consisting principally of lettuce or jellos and frozen desserts of ice cream, frozen custards, etc. or conversely served with the chilled salads and chilled desserts such as eclairs or puddings.

What is claimed:

1. In combination with a device for storing food and repetitively cooking different portions of food, said device consisting of a thermally insulated chamber having refrigeration means to maintain the interior of the chamber at refrigerated temperatures, electric circuit means controlled by a timer and a plurality of thermally insulated heating casseroles containing entree food for storing and cooking, the heating casseroles having integral heating elements connected to said timer controlled circuit, the circuit selectively energizing the heating element of different selected heating casseroles throughout a 24 hour period for repetitive cooking of entree food in the different heating casseroles, the improvement comprising: a thermally insulated tray having restraining means to separately support and restrain movement of said heating casseroles on said tray during the time the heating element of selected heating casseroles are energized for cooking; thermally insulated unheated casseroles disposed on said tray and separated from said heating casseroles by said restraining means, the unheated casseroles containing frozen and/or chilled side dish food during storage and during cooking in the selected casseroles; the thermal insulation of said tray, the heating casseroles, the unheated casseroles, and said refrigeration means retarding the change of phase of any foods contained in any of said casseroles not selected for cooking so that the degree of thaw of frozen food does not exceed 50 percent and the degree of freeze of chilled foods does not exceed 30 percent during the 24 hour period the different heating casseroles are selected for repetitive cooking.

2. An improved food storage and preparation device of the type having a plurality of thermally insulated heating casseroles containing frozen entree food, each casserole having a dish member to support said food disposed within the casserole, the dish member having a low heat capacity and a film resistor integral therewith and within the casserole, said casseroles being disposed in a chamber having refrigeration means to maintain the chamber interior at refrigerated temperatures and an electric circuit connected to a timer and the resistor integral with the dish member of each casserole to energize the resistor of the dish member of selected casseroles to produce heat within the casserole, the low heat capacity of the dish member passing substantially all of the heat produced by the resistor through the dish member into the food to cook the entree food supported therein, wherein the improvement comprises:

a. a plurality of thermally insulated trays supporting one or more individual heating casseroles during storage and during the cooking of the entree food therein, said refrigeration means, the thermal insulation of said heating casseroles and tray, and the low heat capacity of the dish member within said heating casseroles selected for cooking combining to reduce the transfer of heat into the non-selected heating casseroles to maintain the frozen entrees therein at temperature levels of 30° F. and below for a period of 24 hours;

b. one or more thermally insulated unheated casseroles containing frozen side dish food supported by said tray, each unheated casserole having a food supporting member supported in a base in spaced relation from the base, the thermal insulation of said tray and unheated casserole, the low heat capacity of the dish member within said heating casseroles selected for cooking, and said refrigeration means combining to reduce the transfer of heat into the unheated casseroles containing frozen side dish food so that the frozen side dish food is maintained at temperatures of 30° F. and below during storage and during cooking of said heated casseroles for a period of 24 hours; and c. one or more thermally insulated unheated casseroles containing chilled side dish food supported by said tray, the thermal insulation of said tray and said unheated casserole containing chilled foods maintaining the chilled foods at temperatures of 30° F. or above during storage and during cooking of said heating casseroles for a period of 24 hours, said tray, when removed from said chamber, supporting casseroles for serving the food contained in said heating and unheated casseroles.

3. The device of claim 2 wherein the chilled side dish food contained in said unheated casseroles is disposed therein in a thermally insulating wrapping.

4. The device of claim 2 in which the frozen entrees in the non-selected heating casseroles are maintained at temperatures in the range of about 20–30° F. and the chilled side dish food in the unheated casseroles is maintained at temperatures in the range of about 30°–40° F.

5. In combination with a device for storing and cooking food of the type wherein frozen entree food is packed in thermally insulated heating casseroles having integral heating elements, the heating casseroles disposed in a chamber maintained at refrigerated temperatures by refrigerator means, the chamber having an electric circuit connected to the heating elements of said casseroles and a timer to energize selected casseroles for cooking the food therein, the improvement comprising:

a. thermally insulated trays removably disposed in the chamber having first, second, and third recesses therein, one of said heating casseroles disposed in the second recess of each of said trays, the second recess having electrical contacts to interconnect the heating element of said heating casserole to said circuit so that the heating casserole may be selectively energized by said circuit for cooking the entree food therein; and b. thermally insulated unheated casseroles containing frozen and/or chilled side dish foods, said casseroles disposed respectively in the first and third recesses of each of said trays, each of said trays being removable from the chamber after entree food in the heating casserole disposed in the tray has been selected for cooking and the food therein cooked so that the cooked entree food and frozen and/or chilled side dish food is served in the casseroles supported by said trays, the thermal insulation of said trays, heating casseroles, unheated casseroles, and the refrigeration means of said chamber retarding the rate of heat exchange into and out of said casseroles so that substantially no change of phase occurs in said frozen entree food and frozen and/or chilled side dish food until said entree food is selected for cooking and said side dish food is removed from said chamber for serving or until the expiration of a 24 hour period.

6. In a method wherein frozen entree foods are packed in a plurality of heating casseroles and placed in a refrigerated chamber maintained at refrigerated temperatures and different heating casseroles are adapted to be selectively heated during different cooking periods for repetitively cooking entree food in the different selected heating casseroles for periods up to 24 hours, the improvement comprising:

a. packing frozen and chilled side dish foods into separate individual thermally insulated unheated casseroles;

b. placing said heating and unheated casserole into thermally insulated trays adapted to be moved into and out of said chamber, each tray containing at least one heating and one unheated casserole;

c. placing the trays in said chamber for cooking the food in selected heating casseroles, for storing frozen entree food not selected for cooking and for storing frozen and chilled side dish foods until serving same;

d. removing trays containing entree food cooked in said selected heating casseroles and side dish food contained in said unheated casseroles and serving same on said tray, the thermal insulation of said heating and unheated casseroles and said trays remaining in the chamber and the refrigerated temperatures of said chamber retarding the change of phase of frozen entree foods and frozen and chilled side dish foods contained in said heating and unheated casseroles remaining in the chamber;

e. continuing to cook food in different selected eating casseroles and serving same with one or more unheated casseroles of side dish food; and f. after a 24 hour period has passed, removing any remaining unheated casseroles containing chilled side dish foods and lowering the temperature of the chamber to reduce the temperature therein to temperature levels for freezing food in any remaining casseroles.

* * * * *

UNITED STATES PATENT OFFICE
CERTIFICATE OF CORRECTION

Patent No. 3,736,981　　　　　　　　　Dated June 5, 1973

Inventor(s) Thomas S. Shevlin

It is certified that error appears in the above-identified patent and that said Letters Patent are hereby corrected as shown below:

Col. 1, Line 21, "Patent No. 3,654,854" should read -- Patent No. 3,654,853 --.

Col. 4, Line 62, "thermo-stats" should read -- thermostats --.

Col. 6, Line 40, "is not critical" should read -- is not as critical --.

Table I, in the col. 1 heading, delete "Thermo 1".

Table III, in the col. 1 heading, "time" should read -- Time --.

Table III, in the col. 2 heading, "Thermo 1 Air" should read -- Thermo 1 (Air) --.

Col. 14, Claim 6, Line 42, "eating" should read -- heating --.

Signed and sealed this 25th day of December 1973.

(SEAL)
Attest:

EDWARD M. FLETCHER, JR.　　　　RENE D. TEGTMEYER
Attesting Officer　　　　　　　Acting Commssioner of Patents